Patented Mar. 4, 1924.

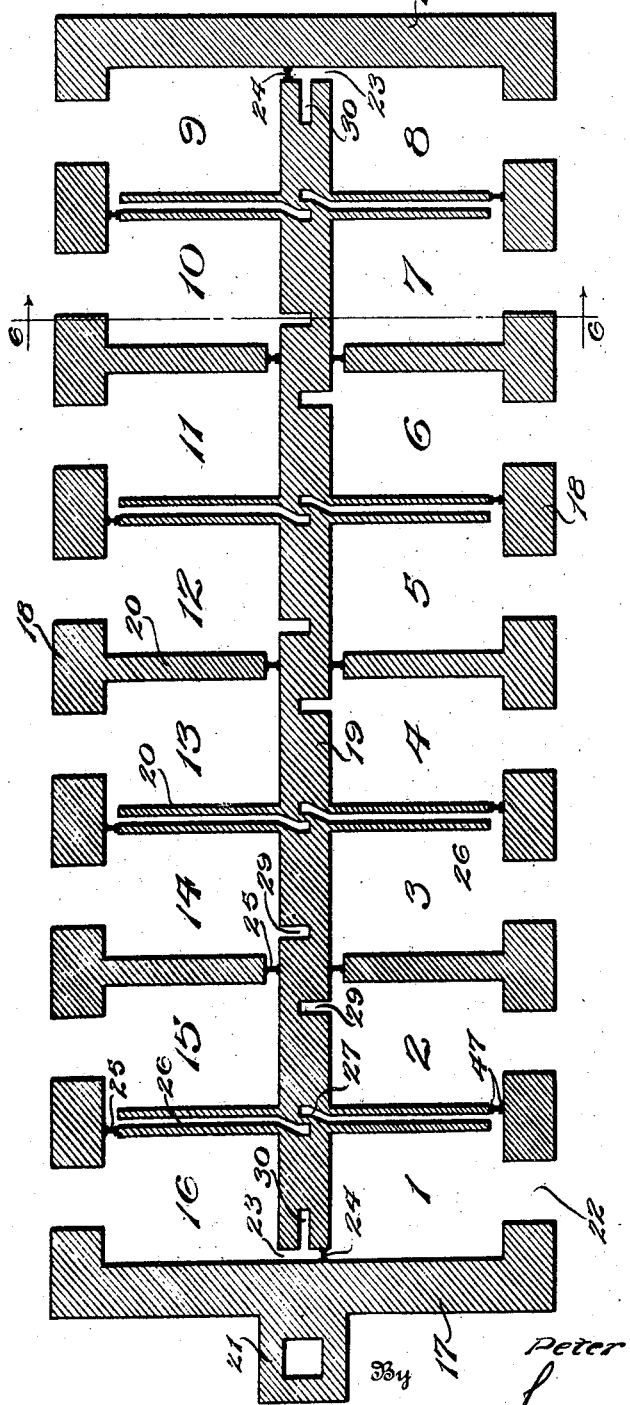

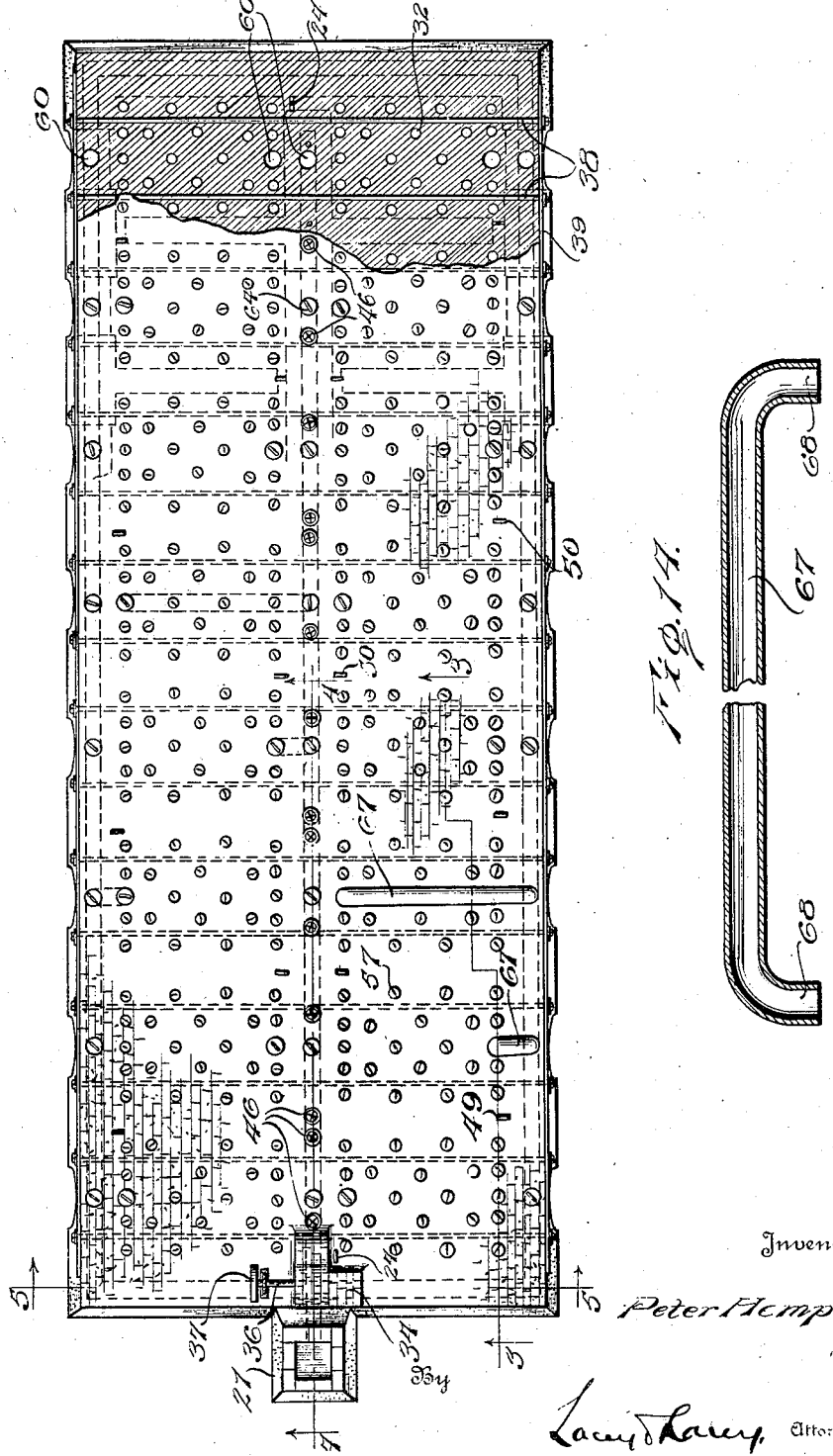

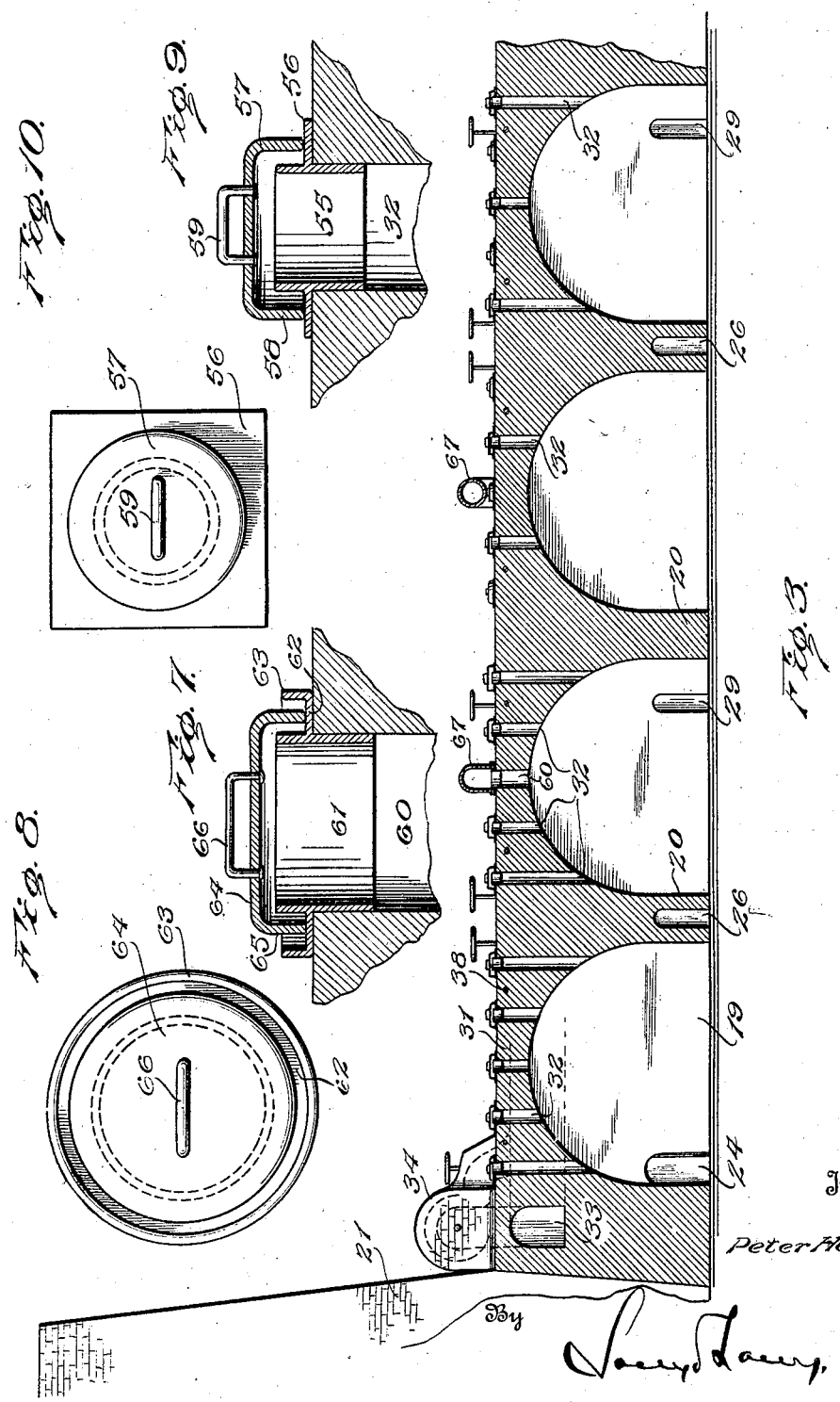

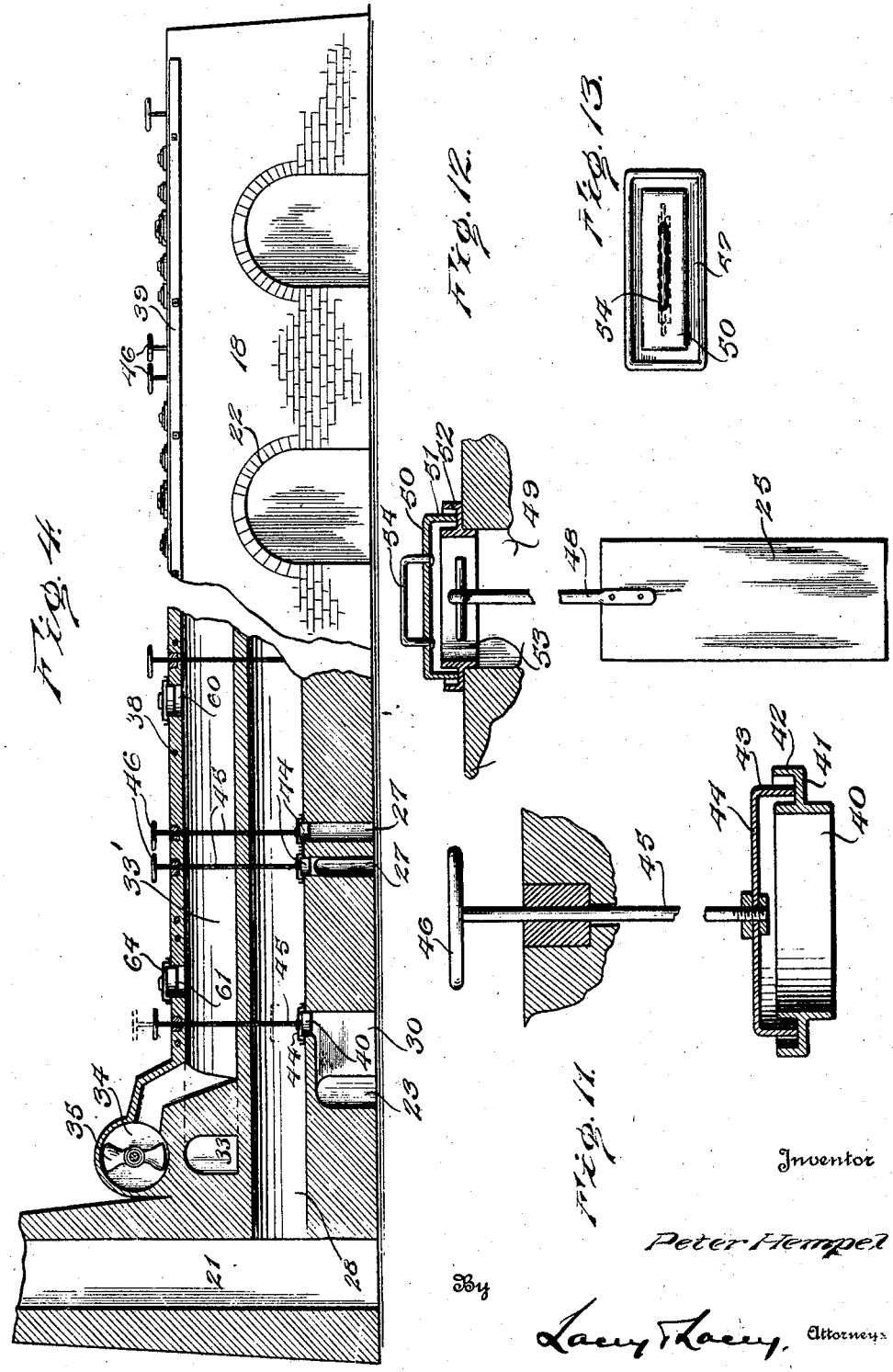

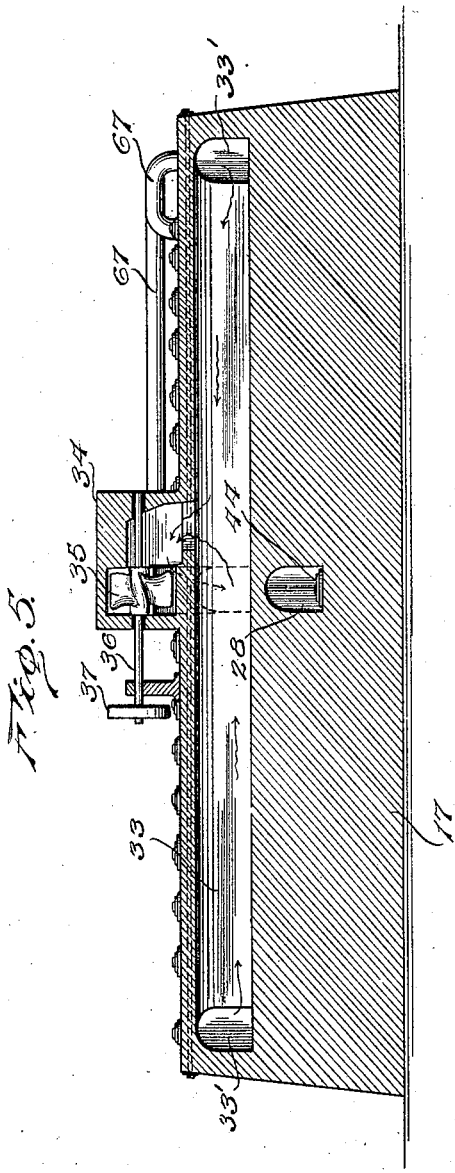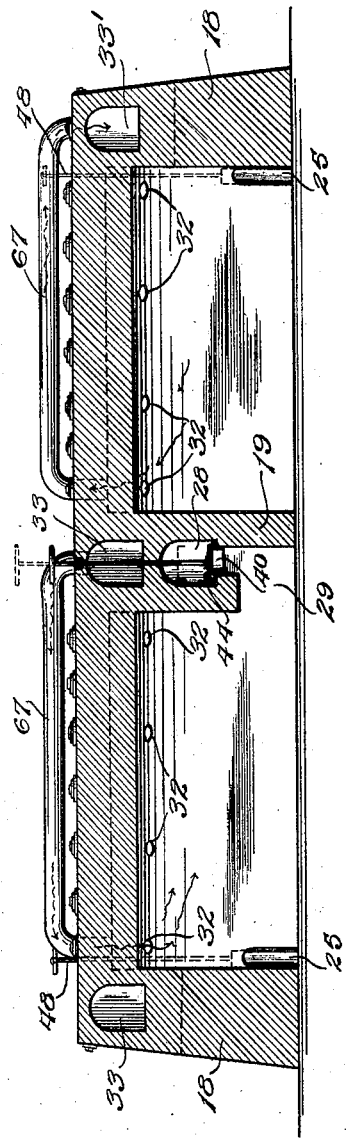

1,485,920

UNITED STATES PATENT OFFICE.

PETER HEMPEL, OF HASTINGS, NEBRASKA.

KILN.

Application filed October 5, 1922. Serial No. 592,529.

*To all whom it may concern:*

Be it known that I, PETER HEMPEL, a citizen of the United States, residing at Hastings, in the county of Adams and State of Nebraska, have invented certain new and useful Improvements in Kilns, of which the following is a specification.

My invention relates to continuous kilns for burning bricks, pottery, or other ware, and has for its object the provision of a kiln which may be more economically and efficiently operated than continuous kilns heretofore known to me. The invention seeks to provide a kiln which may be built at a low cost and which will embody an arrangement of flues and dampers whereby the circulation of heat may be readily controlled so that it may be caused to act progressively upon the several chambers or compartments of the kiln. The invention also seeks to improve generally the construction of a continuous kiln whereby the efficiency of the same will be increased. The invention is illustrated in the accompanying drawings and consists in certain novel features which will be particularly pointed out in the claims following a detailed description.

In the accompanying drawings—

Figure 1 is a horizontal section of a kiln constructed in accordance with my invention, the section being taken in a plane near the ground line;

Fig. 2 is a top plan view of the kiln with parts broken away and in horizontal section;

Fig. 3 is a longitudinal vertical section through some of the burning chambers or compartments, the section being taken on the line 3—3 of Fig. 2;

Fig. 4 is a view, partly in side elevation and partly in longitudinal vertical section on the line 4—4 of Fig. 2;

Fig. 5 is a transverse section on the line 5—5 of Fig. 2;

Fig. 6 is a transverse section on the line 6—6 of Fig. 1;

Fig. 7 is an enlarged detail section through one of the draft openings showing the cap for controlling the same;

Fig. 8 is a top plan view of the structure shown in Fig. 7;

Fig. 9 is an enlarged detail section of the upper end of one of the fuel openings with the cap for closing the same;

Fig. 10 is a top plan view of the structure shown in Fig. 9;

Fig. 11 is an enlarged detail section through one of the valves for controlling the draft flues;

Fig. 12 is an enlarged detail view of one of the dampers employed between adjacent burning chambers or compartments;

Fig. 13 is a top plan view of the closure for the opening in which said damper operates, and Fig. 14 is a detail section of one of the goose necks which is employed in the operation of the kiln.

In carrying out my invention, I construct a kiln to provide a plurality of burning chambers or compartments which are preferably arranged in two parallel series and which may be provided in any number, the present drawings illustrating a kiln having sixteen compartments which are numbered from 1 to 16 respectively in Fig. 1. These several compartments are defined by the end walls 17, the side walls 18, a central longitudinal partition wall 19, and a plurality of transverse partition walls 20, as clearly shown in Fig. 1. Adjacent and preferably connected with one of the end walls is built a smoke stack or chimney 21, although a fan may be employed to create the main draft, instead of the stack if so desired. In the side walls at the outer end or side of each compartment is a door opening or passage 22 through which the ware may be inserted and removed and which, during the burning operation, is closed by a door of any suitable form. The central longitudinal partition wall 19 terminates short of the respective end walls, as shown at 23, and in the spaces thus formed dampers 24 are provided to control the flow of the heat through said spaces, the said dampers at the opposite ends of the kiln being located at opposite sides of the partition. The transverse partition walls 20 terminate alternately short of the side walls and the longitudinal partition and in the spaces thus formed I provide dampers 25 whereby the flow of heat between the adjacent compartments may be controlled. Flues or passages 26 are provided in those partition walls 20 which terminate short of the side walls of the kiln, and these passages communicate with draft openings 27 in the opposite sides of the longitudinal partition to establish communication between the respective chambers and a smoke flue 28 formed in the longitudinal partition and extending from end to end thereof. The alternate burning chambers or compartments are provided at their inner ends with passages 29 corresponding to the passages 27 and likewise communicating with the smoke flue 28. It will be observed that the dampers 25 are so arranged that each burning chamber or compartment will have communication with the smoke flue 28 through a passage 26 and its communicating chamber 27 or through a passage 29 and a similar arrangement is provided at the ends of the kiln by constructing passages or flues 30 in the ends of the longitudinal partition whereby to establish communication between one end chamber or compartment and the smoke flue in the longitudinal partition. As shown most clearly in Fig. 3, the tops or roofs of the several compartments are constructed in an arch form, and through the roof 31 of the kiln openings 32 are formed which terminate at their lower ends in the several arched ceilings or roofs of the compartments. A hot-air return flue is constructed in the roof of the kiln having branches 33 extending across each end of the same and branches 33' extending through the upper portion of the side walls as well as through the central longitudinal partition 19, the hot-air flue in the longitudinal partition being disposed above the smoke flue and closed to the same, as shown most clearly in Fig. 6. The side portions and the central longitudinal portion of the hot-air flue are adapted to be placed in communication with the several compartments or burning chambers through the feed openings 32 by means which will be hereinafter set forth. Upon the roof of the kiln adjacent the stack or chimney 21, I construct a fan chamber 34, the inlet of which is in communication with the adjacent end section 33 of the hot-air flue and the outlet of which communicates with the central longitudinal section 33' of said flue, as will be readily understood upon reference to Figs. 2, 4 and 5. A rotary fan or blower 35 is mounted in the fan chamber and has its shaft 36 extended through one side of the said chamber and equipped with a band pulley 37 whereby power may be imparted to the fan from any convenient source. Tie rods 38 are extended through the roof of the kiln transversely and have their outer ends clamped against anchor plates 39 so as to prevent collapse of the kiln in a well-known manner.

As shown most clearly in Figs. 4 and 6, the several passages 27, 29 and 30 communicate with the smoke flue through the bottom of the latter, and in the openings which establish such communication, I fit collars or rings 40 which are provided upon their external circumferences with annular flanges 41 having upstanding rims 42 at their outer edges, the space between the body of the ring and the upstanding rim constituting a groove to receive the downturned rim 43 of a valve 44 and contain sand to make the valve air-tight. The said valve is carried by a rod 45 which extends upwardly through the top of the smoke flue and the roof of the kiln and is provided above the roof of the kiln with any convenient form of handle, indicated at 46, whereby the damper may be raised or lowered so as to permit or prevent the circulation through the respective passages. The dampers 24 and 25 are flat plates having their vertical side edges slidably fitted in guides, indicated at 47, built upon the adjacent members of the kiln so that vertical movement of the dampers will be permitted but twisting or lateral movement thereof will be prevented. A lifting rod or handle member 48 extends from the upper end of each damper 24 or 25 through a slot in the roof of the kiln, indicated at 49. When the damper is lowered so as to cut off communication between the adjacent chambers or compartments of the kiln, the slot is covered by a cap 50 of oblong form having a depending rim 51 to fit within a cup 52 on the exterior of a thimble 53 which is fitted in the upper end of the slot, the construction of the thimble 53 and the cup 52 being substantially identical with that of the collar 40 and its flange 41 and rim 42, all of which will be readily understood upon reference to Figs. 11 and 12 of the drawings. The cap 50 is equipped with a handle 54 whereby it may be conveniently manipulated. The feed openings or passages 32 in the tops of the several burning chambers or compartments are equipped at their upper ends with collars or thimbles 55 which are provided upon their exterior surfaces with annular flanges or ribs 56 adapted to rest upon the roof of the kiln, and when these fuel feed openings are not in use, they are covered by caps 57 having downturned rims 58 resting upon the flanges 56, as shown in Fig. 9, the caps being provided with handles 59 to facilitate their manipulation. Draft openings 60 are formed through the roof of the kiln in the top of the hot-air flue 33 and in each of these draft openings is secured a collar or thimble 61 having an annular radial flange 62 and an upstanding rim 63 corresponding in all respects to the collar 41, as will be readily understood upon reference to Fig. 7. A cap 64 having a depending rim 65 and a handle 66 is placed over the thimble 61 to rest upon the flange 62 when the draft openings 60 are not brought into play. I also provide goose necks 67 which consist of tubes having their ends turned down, as shown at 68, and these goose necks are provided in such numbers as may be necessary to the successful operation of the kiln. The goose necks are also provided in different lengths, as shown in Figs. 2 and 5.

It is thought the operation of the kiln will be readily understood. The bricks or other ware to be burned are piled within the several compartments in the manner now customary, and by manipulation of the several dampers, the heat is caused to circulate through the several compartments successively and the hot-air is directed into the hot-air flue so as to be returned to the kiln and discharged into the chambers in advance of those being fired so that the ware in the advance chambers will be dried before fire is kindled in the chambers, respectively. For instance, the chambers 1, 2 and 3 may be filled with the ware to be burned and the dampers between the chambers 16 and 1 and between the chambers 1 and 2 and 2 and 3 raised so that circulation may take place freely from the chamber 16 to the chamber 3, the damper between the chambers 3 and 4 being closed and the valve 44 in communication with the chamber 3 being raised to create draft and permit smoke to escape to the stack 21. When the chamber 4 is taken on, the corresponding damper 25 and valve 44 are raised, so that two valves 44 will be open. When the next chamber is added, three valves 44 will be in raised position and there will be a full fire. As soon as the chamber 3 is hot enough to ignite fuel, the valve 44 connected therewith is closed and the valve 44 in the added chamber is opened. A temporary fire-box is placed or built within the chamber 16 and fire kindled therein, the heat from the fire passing into the chamber 1 and thence successively to the chambers 2 and 3. This fire is gradually increased in intensity until the chambers 1 and 2 are hot enough to ignite fuel fed through the fuel feed holes in the tops of said chambers, whereupon the fine coal or other suitable fuel may be admitted through the fire holes or flues 32 and the fire in the chamber 16 permitted to expire. The fire-box in the said chamber may then be withdrawn as it will be no longer needed, the operation of the kiln continuing through ignition of fuel in the several compartments successively as the dampers and valves are adjusted to permit the currents of hot air to flow to and play upon the fuel fed into said compartments through the fire holes in the tops of the same. When the initial ignition is taking place in any one chamber or compartment, the valve 44 controlling the communication between said compartment and the smoke flue 28 is, of course, open and the draft will then be from the chamber through the smoke flue to the chimney or stack and will be strong enough to permit combustion, but as soon as the fire advances and is hot enough to ignite fuel in any chamber, the valve 44 connected with said chamber is closed and another valve 44 in advance of the fire is opened, thus leading the fire on continuously. As the ware is cooling, circulation is effected through the hot-air flues under the force of the fan or blower 35. All the chambers or burning compartments are filled with the ware to be burned and the dampers 25 and 24 are lowered so as to seal them from the adjacent compartments. As the burning progresses, the damper between the chambers 3 and 4 may be raised or opened so that the heat from the chambers 2 and 3 will pass into the chamber 4 and ignite the fuel fed into said chamber, and this operation is repeated through the entire extent of the kiln, the damper between the chambers 1 and 2 being lowered when burning has been completed in said chamber 1 so that the ware therein may be permitted to cool, and when the cooling in the said chamber 1 begins a short goose neck 67 is brought into play and has its downturned ends engaged respectively over one of the fire holes 32 and over an adjacent opening 60 in the top of the side section of the hot-air-flue. The cooling air will then be drawn from the compartment 1 and caused to pass through the flue 33 under the influence of the fan 35 to find an outlet through another opening 60 in the central section of said flue, which opening will be connected by one of the longer goose necks with a fire hole in one of the compartments in advance of the fire. Drying and partial heating of the ware in the said compartment will thereby be effected before burning begins. By properly adjusting the several dampers and the goose necks, the hot-air may be caused to circulate through the compartments and used over and over again and may be directed into any particular compartment according to the stage of operations. If the air thus forced into any compartment becomes too heavily laden with moisture, it may be permitted to pass into the smoke flue through the influence of the draft and thence escape through the chimney. When the ware in the chamber or compartment 1 is sufficiently cooled, it is removed and the chamber then at once refilled, and this operation is repeated successively through the several compartments so that the operation of the kiln will be continuous, the contents of one chamber being removed ordinarily each day.

It will be readily noted that I have provided a kiln in which the operations of burning, drying, cooling, discharging and re-filling will be performed simultaneously so that the kiln is used continuously and an economy in fuel and labor effected. The vertical slidable dampers between adjacent compartments permit cold air to be positively and effectually cut-off as the fire in each compartment is transferred to the next adjacent compartment, and the quantity of air following the fire may be easily regulated so that the fire may be held on the ware the required period of time without any injury to the ware. It will also be noted that I have provided permanent transverse partitions between the several compartments so that there is no time lost in placing partitions between the several compartments as is now a very general practice, paper or other perishable material being employed for such partitions which are placed in position between the successive quantities of the ware as each chamber is filled. These partitions are consumed by the fire and are intended to withhold the fire from a second chamber until burning has been effected in the first chamber, but sometimes the partitions are burned out quickly and at other times very slowly so that the results are uncertain. I obtain a better quality of ware by the use of my kiln and also effect an economy in operation by saving the time and labor needed to construct and place such perishable partitions in position. With my kiln, in order to admit the fire from one chamber to a succeeding chamber, it is necessary merely to withdraw the slidable damper, and the cooling air is positively withdrawn from the chamber in which the ware is finished by the action of the blower and transferred to a chamber in advance of the fire so that, when the fire is eventually admitted to the latter chamber, the goods therein will be partially or wholly dried so that they may be quickly finished without injury. This feature of my kiln permits ware to be placed in the burning chambers while it still contains considerable moisture, as, for instance, when it is fresh from the press.

Having thus described the invention, what is claimed as new is:

1. A kiln comprising side walls, end walls, a central longitudinal partition terminating short of the end walls, and a plurality of transverse partitions terminating alternately short of the side walls and the longitudinal partition and defining compartments, the longitudinal partition having a smoke flue extending the length thereof and also being provided with passages establishing communication between said flue and the inner ends of alternate compartments defined by the transverse partitions, and the transverse partitions which terminate short of the side walls being constructed with passages therethrough establishing communication between the smoke flue and the outer ends of the alternate compartments.

2. A kiln comprising side walls, end walls, a longitudinal partition and a plurality of transverse partitions, said walls and partitions defining series of burning chambers, means for effecting communication between adjoining chambers successively and over a tortuous path through the entire series of chambers, the longitudinal partition being constructed with a smoke flue extending the length thereof and there being passages through some transverse partitions extending from the smoke flue to the outer ends of said partitions and openings in the sides of the longitudinal partition adjacent the alternate transverse partitions whereby to establish communication alternately between the inner and outer ends of the several compartments and the said smoke flue, and a chimney in communication with one end of said smoke flue.

3. A kiln comprising side walls, end walls, a longitudinal partition and a plurality of transverse partitions defining series of burning compartments, a smoke flue in the longitudinal partition means for establishing communication between the several compartments and between the compartments and the smoke flue in the longitudinal partition, a continuous hot-air flue constructed in the side walls and end walls and in the longitudinal partition above the smoke flue, and means for effecting circulation through the several compartments and the hot-air flue.

4. A kiln comprising side walls, end walls, a longitudinal partition and a plurality of transverse partitions, said walls and partitions defining series of burning chambers, there being fuel-feeding passages through the tops of the several chambers, a smoke flue extending the length of the longitudinal partition, means for establishing communication between the several burning chambers and between the opposite ends of alternate chambers and the said smoke flue, a hot-air return flue extending through the longitudinal partition above the smoke flue and closed to the said flue and also extending through the side and end walls, means for effecting forced circulation through said hot-air flue, ports in the top of the central section of said flue and in the side sections of the same, and means for establishing communication between any of said ports and adjacent fuel-feeding openings in the burning chambers.

5. In a kiln having a series of burning chambers constructed with openings in their side walls to permit communication between adjacent chambers and passages rising from said openings to the top of the kiln, dampers disposed within said openings and controlling circulation therethrough, said dampers consisting of flat plates slidably mounted in vertical ways in said openings, and handles rising from said plates, in said passages, thimbles fitted in slots in the top of the kiln at the upper ends of said passages, and caps fitted over said thimbles whereby to cover the dampers and close the said passages.

6. A kiln comprising side walls, end walls, a longitudinal partition and a plurality of transverse partitions defining series of burning compartments, a smoke flue extending the length of the longitudinal partition, means for establishing communication between the several compartments and between the compartments and the smoke flue, a hot-air return flue extending longitudinally in the side walls and in the longitudinal partition above the smoke flue and across the end walls, means for establishing communication between the said hot-air return flue and the burning compartments, and a blower mounted upon the roof of the kiln and having its inlet communicating with the branch of the hot-air flue in one end wall and its outlet communicating with the branch of the hot-air flue in the longitudinal partition.

In testimony whereof I affix my signature.

PETER HEMPEL. [L. S.]